United States Patent
Przestrzelski (10) Patent No.: US 11,593,010 B2
(45) Date of Patent: Feb. 28, 2023

(54) SYSTEMS AND METHODS FOR BLOCK-DATA CLUSTERING-BASED DEDUPLICATION

(71) Applicant: Dell Products L.P., Round Rock, TX (US)

(72) Inventor: Piotr Przestrzelski, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/187,413

(22) Filed: Feb. 26, 2021

(65) Prior Publication Data
US 2022/0276798 A1 Sep. 1, 2022

(51) Int. Cl.
*G06F 3/06* (2006.01)

(52) U.S. Cl.
CPC ............ *G06F 3/0641* (2013.01); *G06F 3/067* (2013.01); *G06F 3/0613* (2013.01); *G06F 3/0647* (2013.01)

(58) Field of Classification Search
None
See application file for complete search history.

(56) References Cited

U.S. PATENT DOCUMENTS

| | | | |
|---|---|---|---|
| 9,747,051 B2* | 8/2017 | Hudzia | G06F 12/1018 |
| 2011/0099351 A1* | 4/2011 | Condict | G06F 3/0641 |
| | | | 711/216 |

* cited by examiner

*Primary Examiner* — Michael Alsip
(74) *Attorney, Agent, or Firm* — Jackson Walker L.L.P.

(57) ABSTRACT

A method may include calculating a cryptographic hash for each of a plurality of data blocks stored on a storage resource, calculating a locality-preserving hash for each of the plurality of data blocks, and performing clustering based on the locality-preserving hashes. The method may also include, for each particular cluster setting a cluster center data block for the particular cluster and for each particular data block of the particular cluster, storing the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

15 Claims, 4 Drawing Sheets

SYSTEMS AND METHODS FOR BLOCK-DATA CLUSTERING-BASED DEDUPLICATION

TECHNICAL FIELD

The present disclosure relates in general to information handling systems, and more particularly systems and methods for block-data clustering based deduplication.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many storage systems in information handling systems rely on data deduplication. Data deduplication is a technique for eliminating duplicate copies of repeating data. Many deduplication techniques exist, many with disadvantages.

SUMMARY

In accordance with the teachings of the present disclosure, the disadvantages and problems associated with storage systems may be reduced or eliminated.

In accordance with embodiments of the present disclosure, an information handling system may include a processor and a deduplication agent embodied in a program of instructions stored in non-transitory computer-readable media, the deduplication agent configured to, when read and executed by the processor, calculate a cryptographic hash for each of a plurality of data blocks stored on a storage resource, calculate a locality-preserving hash for each of the plurality of data blocks, and perform clustering based on the locality-preserving hashes. The deduplication agent may further be configured to, for each particular cluster, set a cluster center data block for the particular cluster and for each particular data block of the particular cluster, store the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

In accordance with these and other embodiments of the present disclosure, a method may include calculating a cryptographic hash for each of a plurality of data blocks stored on a storage resource, calculating a locality-preserving hash for each of the plurality of data blocks, and performing clustering based on the locality-preserving hashes. The method may also include, for each particular cluster setting a cluster center data block for the particular cluster and for each particular data block of the particular cluster, storing the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to calculate a cryptographic hash for each of a plurality of data blocks stored on a storage resource, calculate a locality-preserving hash for each of the plurality of data blocks, and perform clustering based on the locality-preserving hashes. The instructions may also cause the processor to, for each particular cluster, set a cluster center data block for the particular cluster and for each particular data block of the particular cluster, store the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

Figure 1:
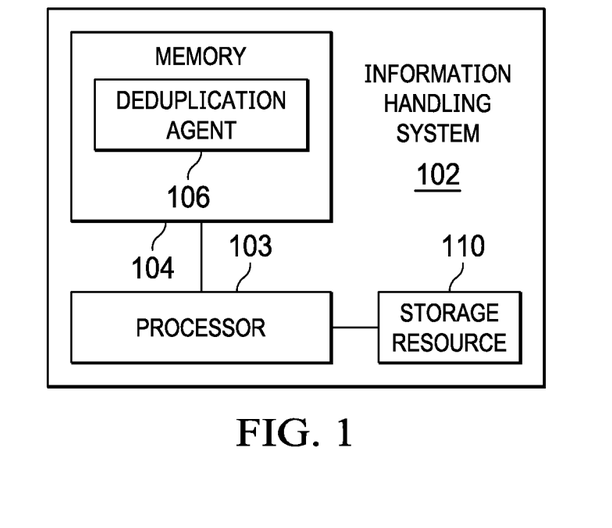
FIG. 1 illustrates a block diagram of an example information handling system, in accordance with certain embodiments of the present disclosure.

FIG. 1 illustrates a block diagram of an example information handling system 102, in accordance with certain embodiments of the present disclosure. In some embodiments, information handling system 102 may be a personal computer. In particular embodiments, information handling system 102 may be a portable information handling system (e.g., a laptop, notebook, tablet, handheld, smart phone, personal digital assistant, etc.). In other embodiments, information handling system 102 may comprise all or portion of a server. In yet other embodiments, information handling system 102 may comprise all or a portion of a storage appliance.

As depicted in FIG. 1, information handling system 102 may include a processor 103, a memory 104 communicatively coupled to processor 103, and a storage resource 110 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a deduplication agent 106. Deduplication agent 106 may comprise a program of instructions which may be read and executed by processor 103 in order to perform block-data, clustering-based deduplication, as described in greater detail below. Speaking in a general sense, deduplication agent 106 may be configured to use clustering methods to store deduplicated data as a list of differences between actual data and cluster center abstract data. Deduplication agent 106 may perform such clustering-based deduplication on a fixed-length block storage device (e.g., storage resource 110). Physical storage of storage resource 110 may comprise a set of data blocks. Deduplication agent 106 may create (as in a classical block storage deduplication approach) a virtual storage that consists of a set of data needed to retrieve the stored information. Such data is then stored in the physical data blocks of storage resource 110 as is described in greater detail below.

A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to information handling system 102, in some embodiments, storage resource 110 may be external to information handling system 102 (e.g., embodied by a physical array of external hard disk drives).

In addition to processor 103, memory 104, and storage resource 110, information handling system 102 may include one or more other information handling resources.

Figure 2:
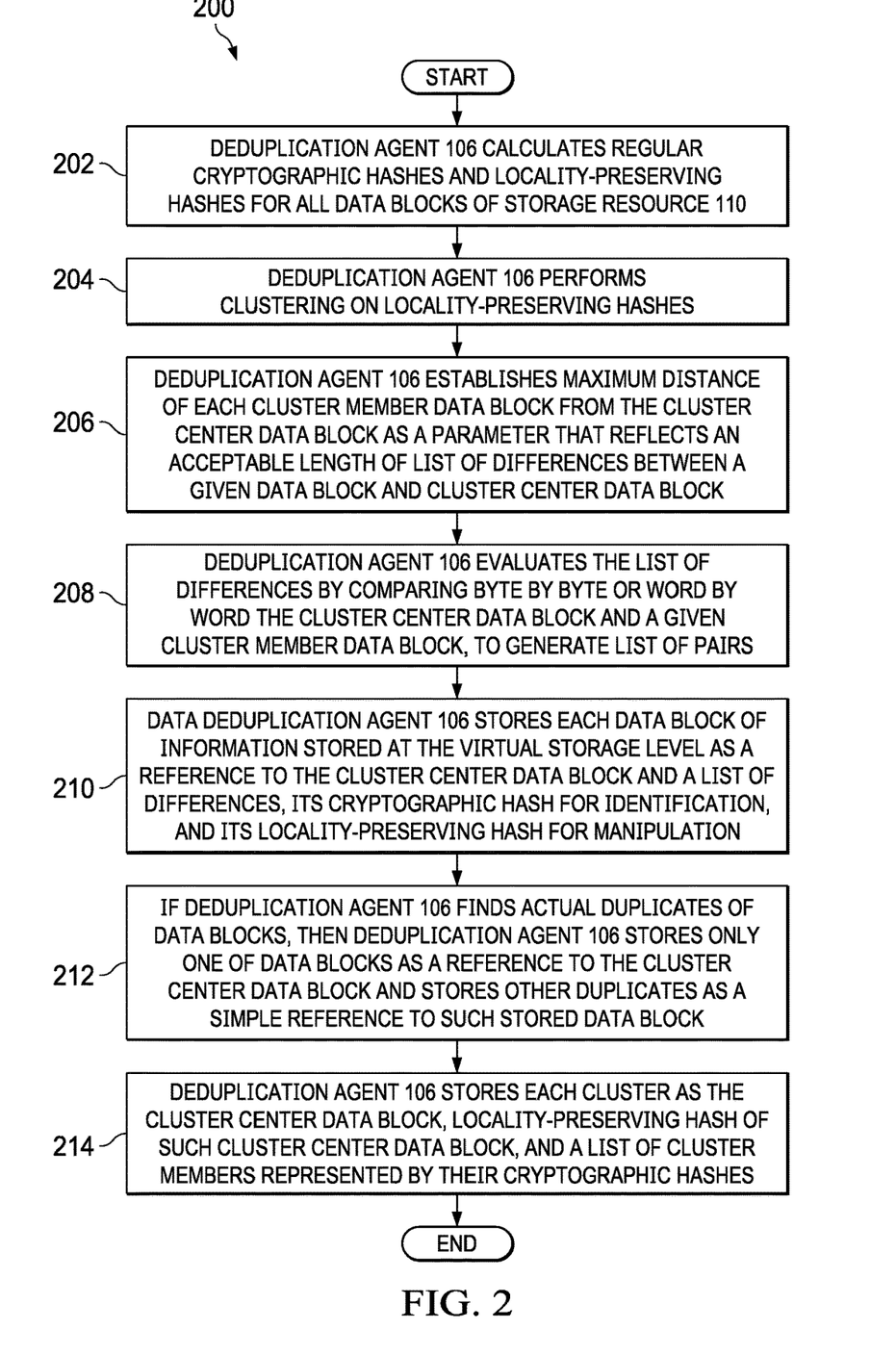
FIG. 2 illustrates a flow chart of an example method for initialization of block-data, cluster-based deduplication, in accordance with certain embodiments of the present disclosure.

FIG. 2 illustrates a flow chart of an example method 200 for initialization of block-data, clustering-based deduplication, in accordance with certain embodiments of the present disclosure. According to one embodiment, method 200 may begin at step 202. As noted above, teachings of the present disclosure may be implemented in a variety of configurations of information handing system 102. As such, the preferred initialization point for method 200 and the order of the steps comprising method 200 may depend on the implementation chosen.

At step 202, deduplication agent 106 may begin block-data, clustering-based deduplication of storage resource 110 by calculating regular cryptographic hashes as well as locality-preserving hashes for all data blocks of storage resource 110. Such operation may return a list of pairs of hashes associated with references to the data blocks in storage resource 110. Deduplication agent 106 may use the cryptographic hashes for data block identification, while using the locality-preserving hashes for clustering. A locality-preserving hash may be a hash function f that maps a point or points in a multidimensional coordinate space to a scalar value, such that if there are three points A, B, and C and $|A-B|<|B-C|$, then $|f(A)-f(B)|<|f(B)-f(C)|$. In other words, a locality-preserving hash may comprise a hash function in which the relative distance between the input values is preserved in the relative distance between the output hash values, such that input values that are closer to each other will produce output hash values that are closer to each other.

At step 204, deduplication agent 106 may perform clustering on the locality-preserving hashes. The locality-preserving hashing itself may undertake clustering by mapping "very similar" data to the same buckets. Still, deduplication agent 106 may gather, into the same cluster, data blocks that fall into different buckets such that distance of such buckets is small. So, effectively, method 200 may enable two clustering levels: first by locality-preserving hashing (step 202), then, clustering performed on these hashes themselves (step 204).

To perform this second-level clustering, deduplication agent 106 may take advantage of a suitable industry-available clustering algorithm. For example, deduplication agent 106 may, in order to perform clustering, discover a number of clusters (no fixed number of clusters) and ensure that the clusters satisfy a constraint of maximum distance of each cluster member data block from a cluster center data block. In some instances, a cluster center data block might comprise an "abstract" data block in which none of the actual data blocks belong to the cluster.

At step 206, deduplication agent 106 may establish the maximum distance of each cluster member data block from the cluster center data block as a parameter that reflects an acceptable length of list of differences between a given data block and cluster center data block. In this context, a "distance" may be defined as a number of bytes or words in which two data blocks differ. If the size of a list of differences is equal to or bigger than a data block itself, then creating another cluster is a more efficient solution (from a storage standpoint) than saving a list of differences, and thus, deduplication agent 106 may limit the size of a list. While the clustering performed by deduplication agent 106 may work on locality-preserving hashes, of significance may be the distance of data blocks that the hashes were derived from. As per the definition of locality-preserving hashing above, distance of the hashes corresponds to distance of the data blocks.

However, there may be no general function that could be used to translate the distance of the hashes to the distance of data blocks. The relationship between hashes distance and data block distance may need to be evaluated once for a given deduplication system by calibration. For example, such calibration may comprise picking a number of random data blocks and their hashes in storage resource 110, then performing a linear regression to find out how, statistically, difference of hashes map to difference of data block distance. This information may then be used by deduplication agent 106 to find out the cluster limits.

The clustering operation performed in step 206 may return a set of clusters, wherein each cluster is represented by a cluster center data block, a cluster center data block locality-preserving hash, and a list of cluster members. Each member may be represented by its cryptographic hash, locality-preserving hash, and a list of differences (e.g., byte-wise or word-wise: offset of the difference and logical exclusive-OR value) between such cluster member data block and the cluster center data block.

In an extreme case, when a cluster comprises a single member, the cluster center data block may be equal to the member data block, and thus the cluster data may comprise the data block itself, its locality-preserving hash (equal to the member locality-preserving hash), both hashes of the member data block, and an empty list of differences. In such case, the deduplication overhead may be small. When a cluster comprises two members, the cluster center data block may be in the middle of the distance between the member data blocks. Each member may be represented by the two hashes, reference to the cluster, and a list of differences.

At step 208, deduplication agent 106 may evaluate the list of differences by comparing byte by byte or word by word the cluster center data block and a given cluster member data block. A result of such operation may be a list of pairs (offset from the beginning of the block and a logical exclusive OR value). The logical exclusive OR value may be the byte or word, such that when a full list of values is logically exclusive OR'ed at their corresponding offsets to the cluster center data block, the result is the cluster member data block. Note that even if the locality-preserving hashes of two data blocks are equal, the data blocks may still differ at one or more positions.

At step 210, data deduplication agent 106 may store each data block of information stored at the virtual storage level as a reference to the cluster center data block and a list of differences (e.g., byte-wise or word-wise as offset of the difference and a logical exclusive OR value), its cryptographic hash for identification, and its locality-preserving hash for manipulation. So, in the physical storage, one physical data block may be used to store the cluster center data block (and it may be common to the cluster) and some physical storage may be used to store the references to this cluster center, the hashes, and the list of differences.

At step 212, if deduplication agent 106 finds actual duplicates of data blocks (e.g., cryptographic hashes of such data blocks are equal), then deduplication agent 106 may store only one of the data blocks as a reference to the cluster center data block, while the other duplicates may be stored as a simple reference to such stored data block.

At step 214, deduplication agent 106 may store each cluster as the cluster center data block, locality-preserving hash of such cluster center data block, and a list of cluster members represented by their cryptographic hashes.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handing system 102 or any other system operable to implement method 200. In certain embodiments, method 200 may be implemented partially or fully in software and/or firmware embodied in computer-readable media.

Figure 3:
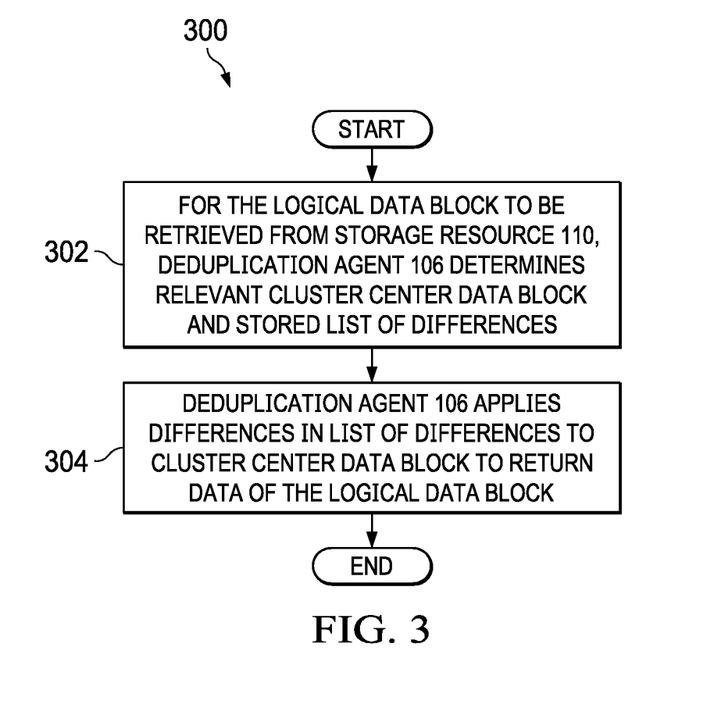
FIG. 3 illustrates a flow chart of an example method for retrieving a logical data block, in accordance with certain embodiments of the present disclosure.

FIG. 3 illustrates a flow chart of an example method 300 for retrieving a logical data block, in accordance with certain embodiments of the present disclosure. According to one embodiment, method 300 may begin at step 302. As noted above, teachings of the present disclosure may be implemented in a variety of configurations of information handing system 102. As such, the preferred initialization point for method 300 and the order of the steps comprising method 300 may depend on the implementation chosen.

At step 302, deduplication agent 106 may, for the logical data block to be retrieved from storage resource 110, determine the relevant cluster center data block and the stored list of differences. At step 304, deduplication agent 106 may apply (e.g., by performing a logical XOR) the differences in the list of differences to the cluster center data block, which may return data of the logical data block.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handing system 102 or any other system operable to implement method 300. In certain embodiments, method 300 may be implemented partially or fully in software and/or firmware embodied in computer-readable media.

Figure 4:
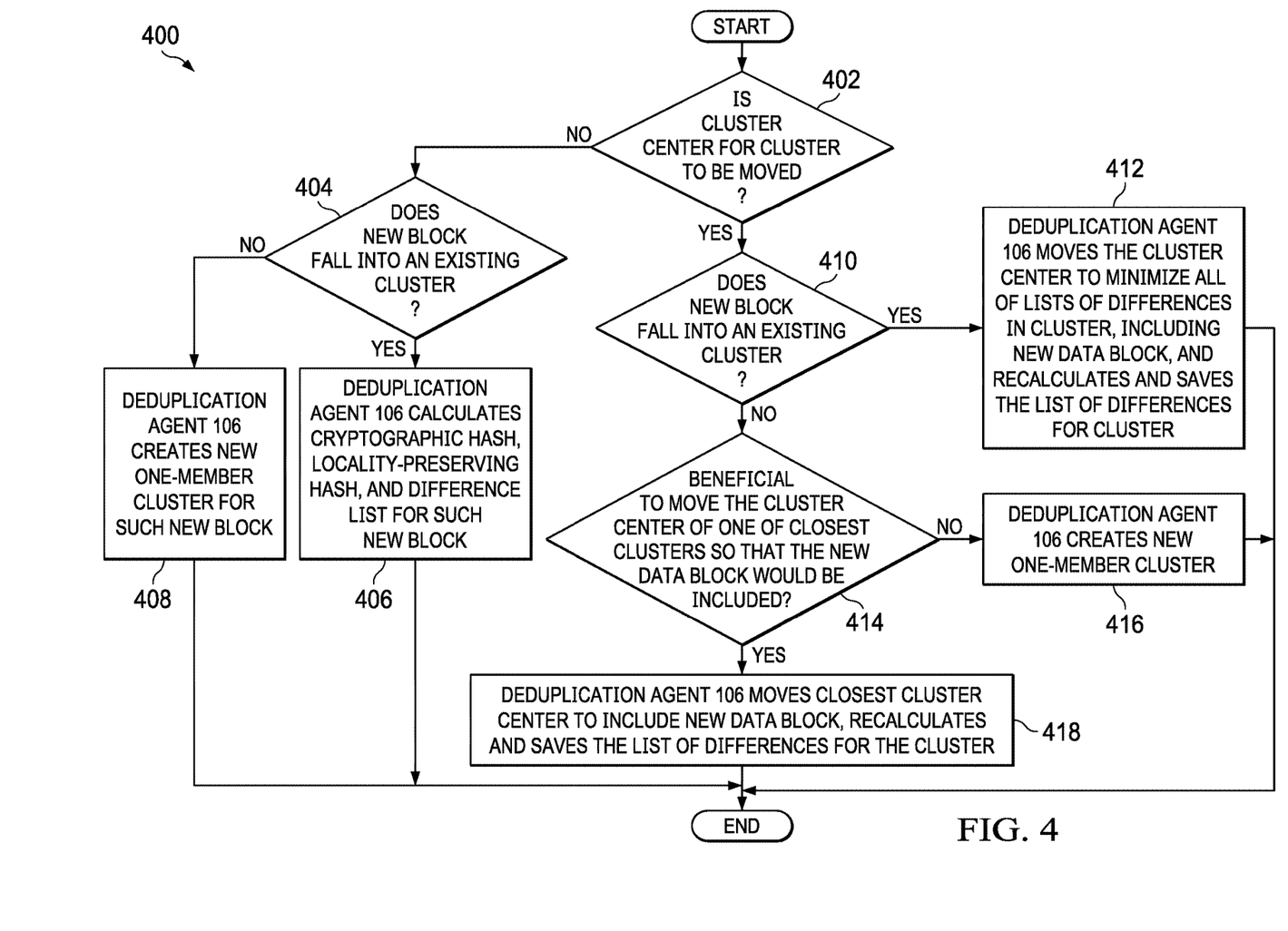
FIG. 4 illustrates a flow chart of an example method for saving a new logical data block, in accordance with certain embodiments of the present disclosure.

FIG. 4 illustrates a flow chart of an example method 400 for saving a new logical data block, in accordance with certain embodiments of the present disclosure. According to one embodiment, method 400 may begin at step 402. As noted above, teachings of the present disclosure may be implemented in a variety of configurations of information handing system 102. As such, the preferred initialization point for method 400 and the order of the steps comprising method 400 may depend on the implementation chosen.

In order to limit computational effort and input/output operations, modifying a cluster center data block should be avoided, because every change of a cluster center data block would trigger recalculation of lists of differences for every cluster member of a cluster comprising the cluster center data block. However, leaving the cluster centers unmoved for a long period of time, when new data blocks are added (or removed), may cause the clusters to become imbalanced or suboptimal. Moreover, it may be beneficial to move the cluster center should such moving prevent the creation of a new cluster or help to reduce the length of lists of differences. Deduplication agent 106 may address this problem by checking every N-th change whether it would be beneficial to move the cluster center based on data blocks added or removed, where N is a configurable parameter of the system. Changing an existing block operation may comprise removing an old block and adding a new block one.

At step 402, deduplication agent 106 may determine, in response to a request to save a new data block, whether the cluster center for a cluster is to be moved. If the cluster center is not to be moved, method 400 may proceed to step 404. Otherwise, method 400 may proceed to step 410.

At step 404, deduplication agent 106 may determine whether the new block falls into an existing cluster (e.g., falls inside the cluster boundaries defined by the maximum distance from the cluster center). If the new block falls into an existing cluster, method 400 may proceed to step 406. Otherwise, method 400 may proceed to step 408.

At step 406, deduplication agent 106 may calculate a cryptographic hash, a locality-preserving hash, and a difference list for such new block. After completion of step 406, method 400 may end.

At step 408, deduplication agent 106 may create a new one-member cluster for such new block. After completion of step 408, method 400 may end.

At step 410, deduplication agent 106 may determine whether the new block falls into an existing cluster (e.g., falls inside the cluster boundaries defined by the maximum distance from the cluster center that is moved). If the new block falls into an existing cluster, method 400 may proceed to step 412. Otherwise, method 400 may proceed to step 414.

At step 412, deduplication agent 106 may move the cluster center to minimize all of the lists of differences in the cluster, including the new data block, and then recalculate and save the list of differences for the cluster. After completion of step 412, method 400 may end.

At step 414, deduplication agent 106 may check the closest clusters to determine if it would be beneficial to move the cluster center so that the new data block would be included. If it would not be beneficial to move the cluster center so that the new data block would be included, method 400 may proceed to step 416. Otherwise, method 400 may proceed to step 418.

At step 416, deduplication agent 106 may create a new one-member cluster. After completion of step 416, method 400 may end.

At step 418, deduplication agent 106 may move the closest cluster center to include the new data block, and then recalculate and save the list of differences for the cluster. After completion of step 418, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handing system 102 or any other system operable to implement method 400. In certain embodiments, method 400 may be implemented partially or fully in software and/or firmware embodied in computer-readable media.

Figure 5:
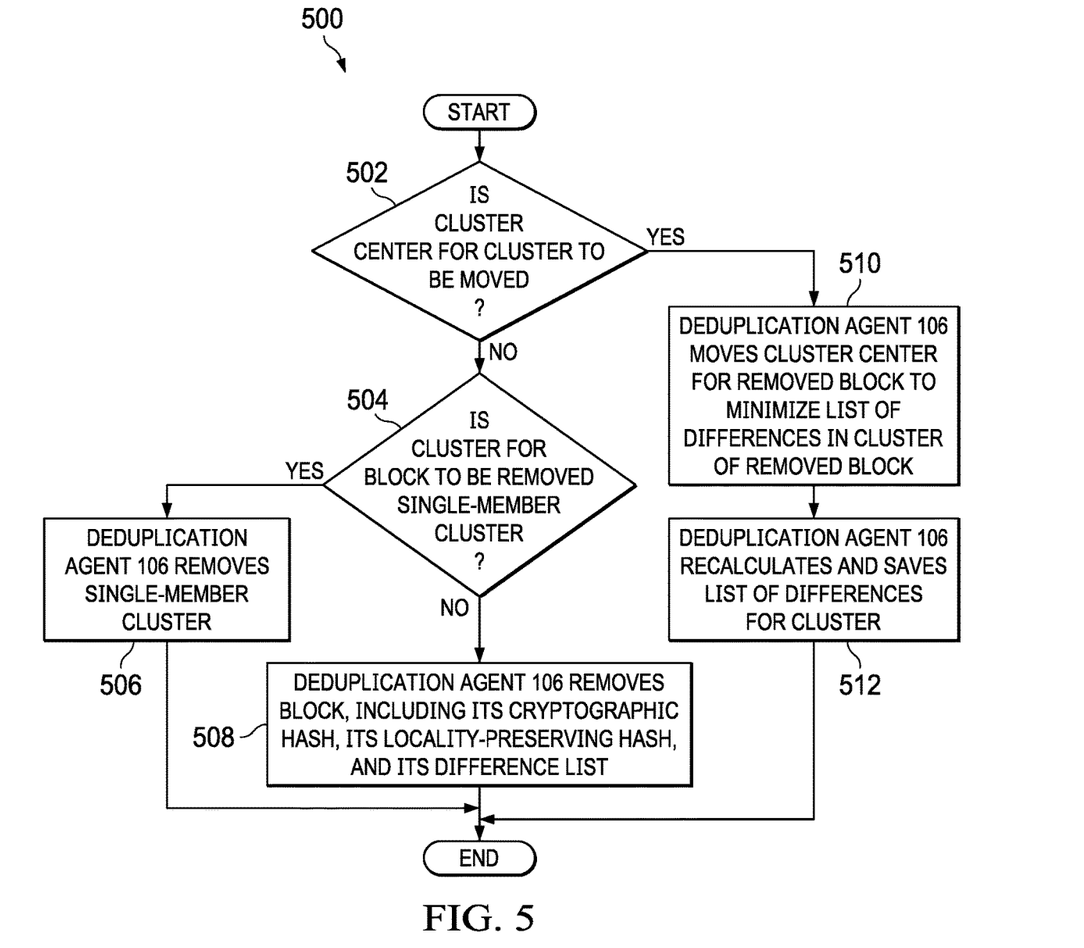
FIG. 5 illustrates a flow chart of an example method for removing an existing logical data block, in accordance with certain embodiments of the present disclosure.

FIG. 5 illustrates a flow chart of an example method 500 for removing a data block, in accordance with certain embodiments of the present disclosure. According to one embodiment, method 500 may begin at step 502. As noted above, teachings of the present disclosure may be implemented in a variety of configurations of information handing system 102. As such, the preferred initialization point for method 500 and the order of the steps comprising method 500 may depend on the implementation chosen.

At step 502, deduplication agent 106 may determine, in response to a request to remove an existing data block, whether the cluster center for a cluster is to be moved. If the cluster center is not to be moved, method 500 may proceed to step 504. Otherwise, method 500 may proceed to step 510.

At step 504, deduplication agent 106 may determine if the cluster for the block to be removed is a single-member cluster. If the cluster for the block to be removed is a single-member cluster, method 500 may proceed to step 506. Otherwise, method 500 may proceed to step 508.

At step 506, deduplication agent 106 may remove the single-member cluster. After completion of step 506, method 500 may end.

At step 508, deduplication agent 106 may remove the block, including its cryptographic hash, its locality-preserving hash, and its difference list. After completion of step 508, method 500 may end.

At step 510, deduplication agent 106 may move the cluster center for the removed block to minimize the list of differences in the cluster of the removed block. At step 512, deduplication agent 106 may recalculate and save the list of differences for the cluster. After completion of step 512, method 500 may end.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using information handing system 102 or any other system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor; and
a deduplication agent embodied in a program of instructions stored in non-transitory computer-readable media, the deduplication agent configured to, when read and executed by the processor:
calculate a cryptographic hash for each of a plurality of data blocks stored on a storage resource;
calculate, with a locality-preserving hash function, a locality-preserving hash for each of the plurality of data blocks wherein a distance between locality-preserving hashes of two inputs that have a first input distance between them is less than a distance between locality-preserving hashes for two inputs that have a second distance between them when the first input distance is less than the second input distance;
perform clustering based on the locality-preserving hashes; and
for each particular cluster:
set a cluster center data block for the particular cluster; and
for each particular data block of the particular cluster, store the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

2. The information handling system of claim 1, wherein the deduplication agent is further configured to, in response to finding a duplicate of a data block of a particular cluster:

store the data block as a reference to the cluster center data block for the cluster; and
store the duplicate as a reference to the data block.

3. The information handling system of claim 1, wherein the deduplication agent is further configured to, in response to a request to receive a logical data block from the storage resource:
   determine a relevant cluster center data block of a cluster for the logical data block and a stored list of differences for the cluster; and
   apply the differences to the cluster center data block to return data of the logical data block.

4. The information handling system of claim 1, wherein the deduplication agent is further configured to, in response to a request to store a new block to the storage resource:
   determine if moving a cluster center for a cluster would increase storage efficiency;
   determine if the new block falls within the boundaries of an existing cluster;
   if the new block falls within the boundaries of an existing cluster and if moving the cluster center for such existing cluster would increase storage efficiency, move the cluster center for the existing cluster to minimize lists of differences for the existing cluster including for the new block, and recalculate the list of differences for the existing cluster;
   if the new block falls outside the boundaries of the existing cluster and if moving the cluster center for another nearby cluster would increase storage efficiency, move the cluster center for the nearby cluster to include the new block, and recalculate the list of differences for the nearby cluster;
   if the new block falls outside the boundaries of the existing cluster and if moving the cluster center for another nearby cluster would not increase storage efficiency, create a new one-member cluster for the new block;
   if the new block falls within the boundaries of the existing cluster and if moving the cluster center for the existing cluster would not increase storage efficiency, calculate a cryptographic hash, a locality-preserving hash, and a different list for the new block; and
   if the new block falls outside the boundaries of the existing cluster and if moving the cluster center for the existing cluster would not increase storage efficiency, create a new one-member cluster for the new block.

5. The information handling system of claim 1, wherein the deduplication agent is further configured to, in response to a request to remove a block from the storage resource:
   determine if moving a cluster center for the cluster including the block would increase storage efficiency;
   if moving the cluster center for the cluster including the block would not increase storage efficiency, remove the block, including the cryptographic hash, the locality-preserving hash, and the difference list for the block; and
   if moving the cluster center for the cluster including the block would increase storage efficiency, move the cluster center for the cluster including the block to minimize lists of differences for the cluster including the block, and recalculate the list of differences for such cluster.

6. A method comprising:
   calculating a cryptographic hash for each of a plurality of data blocks stored on a storage resource;
   calculating, with a locality-preserving hash function, a locality-preserving hash for each of the plurality of data blocks, wherein a distance between locality-preserving hashes of two inputs that have a first input distance between them is less than a distance between locality-preserving hashes for two inputs that have a second distance between them when the first input distance is less than the second input distance;
   performing clustering based on the locality-preserving hashes; and
   for each particular cluster:
      setting a cluster center data block for the particular cluster; and
      for each particular data block of the particular cluster, storing the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

7. The method of claim 6, further comprising, in response to finding a duplicate of a data block of a particular cluster:
   storing the data block as a reference to the cluster center data block for the cluster; and
   storing the duplicate as a reference to the data block.

8. The method of claim 6, further comprising, in response to a request to receive a logical data block from the storage resource:
   determining a relevant cluster center data block of a cluster for the logical data block and a stored list of differences for the cluster; and
   applying the differences to the cluster center data block to return data of the logical data block.

9. The method of claim 6, further comprising, in response to a request to store a new block to the storage resource:
   determining if moving a cluster center for a cluster would increase storage efficiency;
   determining if the new block falls within the boundaries of an existing cluster;
   if the new block falls within the boundaries of an existing cluster and if moving the cluster center for such existing cluster would increase storage efficiency, moving the cluster center for the existing cluster to minimize lists of differences for the existing cluster including for the new block, and recalculating the list of differences for the existing cluster;
   if the new block falls outside the boundaries of the existing cluster and if moving the cluster center for another nearby cluster would increase storage efficiency, moving the cluster center for the nearby cluster to include the new block, and recalculating the list of differences for the nearby cluster;
   if the new block falls outside the boundaries of the existing cluster and if moving the cluster center for another nearby cluster would not increase storage efficiency, creating a new one-member cluster for the new block;
   if the new block falls within the boundaries of the existing cluster and if moving the cluster center for the existing cluster would not increase storage efficiency, calculating a cryptographic hash, a locality-preserving hash, and a different list for the new block; and
   if the new block falls outside the boundaries of the existing cluster and if moving the cluster center for the existing cluster would not increase storage efficiency, creating a new one-member cluster for the new block.

10. The method of claim 6, further comprising, in response to a request to remove a block from the storage resource:
- determining if moving a cluster center for the cluster including the block would increase storage efficiency;
- if moving the cluster center for the cluster including the block would not increase storage efficiency, removing the block, including the cryptographic hash, the locality-preserving hash, and the difference list for the block; and
- if moving the cluster center for the cluster including the block would increase storage efficiency, moving the cluster center for the cluster including the block to minimize lists of differences for the cluster including the block, and recalculating the list of differences for such cluster.

11. An article of manufacture comprising:
a non-transitory computer-readable medium; and
computer-executable instructions carried on the computer-readable medium, the instructions readable by a processor, the instructions, when read and executed, for causing the processor to:
- calculate a cryptographic hash for each of a plurality of data blocks stored on a storage resource;
- calculate, with a locality-preserving hash function, a locality-preserving hash for each of the plurality of data blocks wherein a distance between locality-preserving hashes of two inputs that have a first input distance between them is less than a distance between locality-preserving hashes for two inputs that have a second distance between them when the first input distance is less than the second input distance;
- perform clustering based on the locality-preserving hashes; and
- for each particular cluster:
  - set a cluster center data block for the particular cluster; and
  - for each particular data block of the particular cluster, store the particular data block as a cluster member data block including a reference to the cluster center data block for the particular cluster, a list of differences of the particular data block from the cluster member data block, the cryptographic hash for the particular data block to identify the particular data block, and the locality-preserving hash for the particular data block for manipulation of the particular data block.

12. The article of claim 11, the instructions for further causing the processor to, in response to finding a duplicate of a data block of a particular cluster:
- store the data block as a reference to the cluster center data block for the cluster; and
- store the duplicate as a reference to the data block.

13. The article of claim 11, the instructions for further causing the processor to, in response to a request for receive a logical data block from the storage resource:
- determine a relevant cluster center data block of a cluster for the logical data block and a stored list of differences for the cluster; and
- apply the differences to the cluster center data block to return data of the logical data block.

14. The article of claim 11, the instructions for further causing the processor to, in response to a request to store a new block to the storage resource:
- determine if moving a cluster center for a cluster would increase storage efficiency;
- determine if the new block falls within the boundaries of an existing cluster;
- if the new block falls within the boundaries of an existing cluster and if moving the cluster center for such existing cluster would increase storage efficiency, move the cluster center for the existing cluster to minimize lists of differences for the existing cluster including for the new block, and recalculate the list of differences for the existing cluster;
- if the new block falls outside the boundaries of the existing cluster and if moving the cluster center for another nearby cluster would increase storage efficiency, move the cluster center for the nearby cluster to include the new block, and recalculate the list of differences for the nearby cluster;
- if the new block falls outside the boundaries of the existing cluster and if moving the cluster center for another nearby cluster would not increase storage efficiency, create a new one-member cluster for the new block;
- if the new block falls within the boundaries of the existing cluster and if moving the cluster center for the existing cluster would not increase storage efficiency, calculate a cryptographic hash, a locality-preserving hash, and a different list for the new block; and
- if the new block falls outside the boundaries of the existing cluster and if moving the cluster center for the existing cluster would not increase storage efficiency, create a new one-member cluster for the new block.

15. The article of claim 11, the instructions for further causing the processor to, in response to a request to remove a block from the storage resource:
- determine if moving a cluster center for the cluster including the block would increase storage efficiency;
- if moving the cluster center for the cluster including the block would not increase storage efficiency, remove the block, including the cryptographic hash, the locality-preserving hash, and the difference list for the block; and
- if moving the cluster center for the cluster including the block would increase storage efficiency, move the cluster center for the cluster including the block to minimize lists of differences for the cluster including the block, and recalculate the list of differences for such cluster.

\* \* \* \* \*